Figure 1:
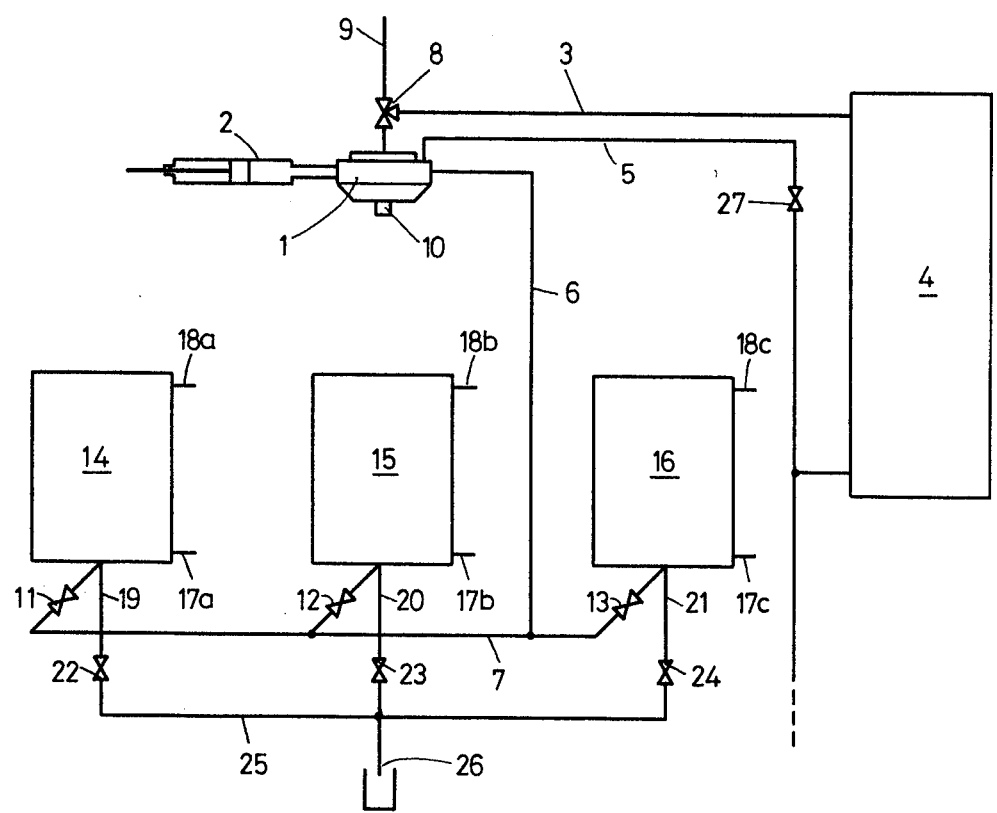

United States Patent [19]

Fierz

[11] 4,098,175

[45] Jul. 4, 1978

[54] AUTOMATIC COFFEE-BREWING MACHINE

[75] Inventor: Heinrich Fierz, Zürich, Switzerland

[73] Assignee: Hagezet Aktiengesellschaft, Zurich, Switzerland

[21] Appl. No.: 690,268

[22] Filed: May 26, 1976

[30] Foreign Application Priority Data

Jun. 6, 1975 [CH] Switzerland ............................ 7297/75

[51] Int. Cl.² .................................................. A23F 1/08
[52] U.S. Cl. ................................. 99/283; 99/289 R
[58] Field of Search ................ 99/280, 281, 283, 291, 99/316, 289 R, 295, 299, 302 R

[56] References Cited

U.S. PATENT DOCUMENTS 3,124,056   3/1964   Hayes ........................................ 99/283

FOREIGN PATENT DOCUMENTS 438,184   11/1935   United Kingdom .................... 99/283

Primary Examiner—Edward L. Roberts
Attorney, Agent, or Firm—Darby & Darby

[57] ABSTRACT

An automatic coffee-brewing machine comprising a plurality of storage containers, each holding one charge of brewed coffee, connected in parallel between a brewing chamber and a brewed-coffee outlet. By means of an arrangement of sensors and valves, the containers are successively filled and successively emptied automatically.

1 Claim, 2 Drawing Figures

AUTOMATIC COFFEE-BREWING MACHINE

This invention relates to an automatic coffee-brewing machine of the type comprising at least one brewing chamber and an outlet for brewed coffee.

A prime requirement of automatic coffee-brewing machines is that they be designed to dispense coffee which is as fresh as possible regardless of the rate at which the machine is called upon to dispense brewed coffee. The freshness of the brewed coffee is indirectly proportional to the length of time elapsing between brewing and dispensing, and it also depends upon keeping freshly-brewed coffee from being mixed with stale coffee. Moreover, a loss of freshness will occur if the brewed coffee is caused to flow through a succession of containers, for it then unavoidably comes in contact with an increased amount of oxygen from the air, thus dissipating its aroma.

In a machine of the aforementioned kind as disclosed in Swiss Pat. No. 437,692, a storage container having an outlet cock communicates with the brewing apparatus via a relatively small collecting container, and each time the level of brewed coffee drops below a certain point, control means in the storage container cause the brewing operation to restart. When only a comparatively small volume of brewed coffee is involved, this restarting of the brewing operation makes it possible to dispense fresh coffee regardless of the dispensing rate. However, whenever brewing is restarted before the coffee level has reached its lowest point, a mixture of the freshly-brewed coffee with the stale coffee in the storage container cannot be avoided. Furthermore, the coffee aroma is impaired by the interposition of the collecting container and the resultant increased influence of oxygen from the air.

It is an object of this invention to provide an automatic coffee-brewing machine of the type initially mentioned in which the foregoing drawbacks are eliminated.

To this end, the automatic coffee-brewing machine according to the present invention further comprises a plurality of storage containers connected in parallel between the brewing chamber and the brewed-coffee outlet, each such container having a capacity equal to one predetermined charge of brewed coffee, and means for successively filling and successively emptying these containers.

Figure 2:
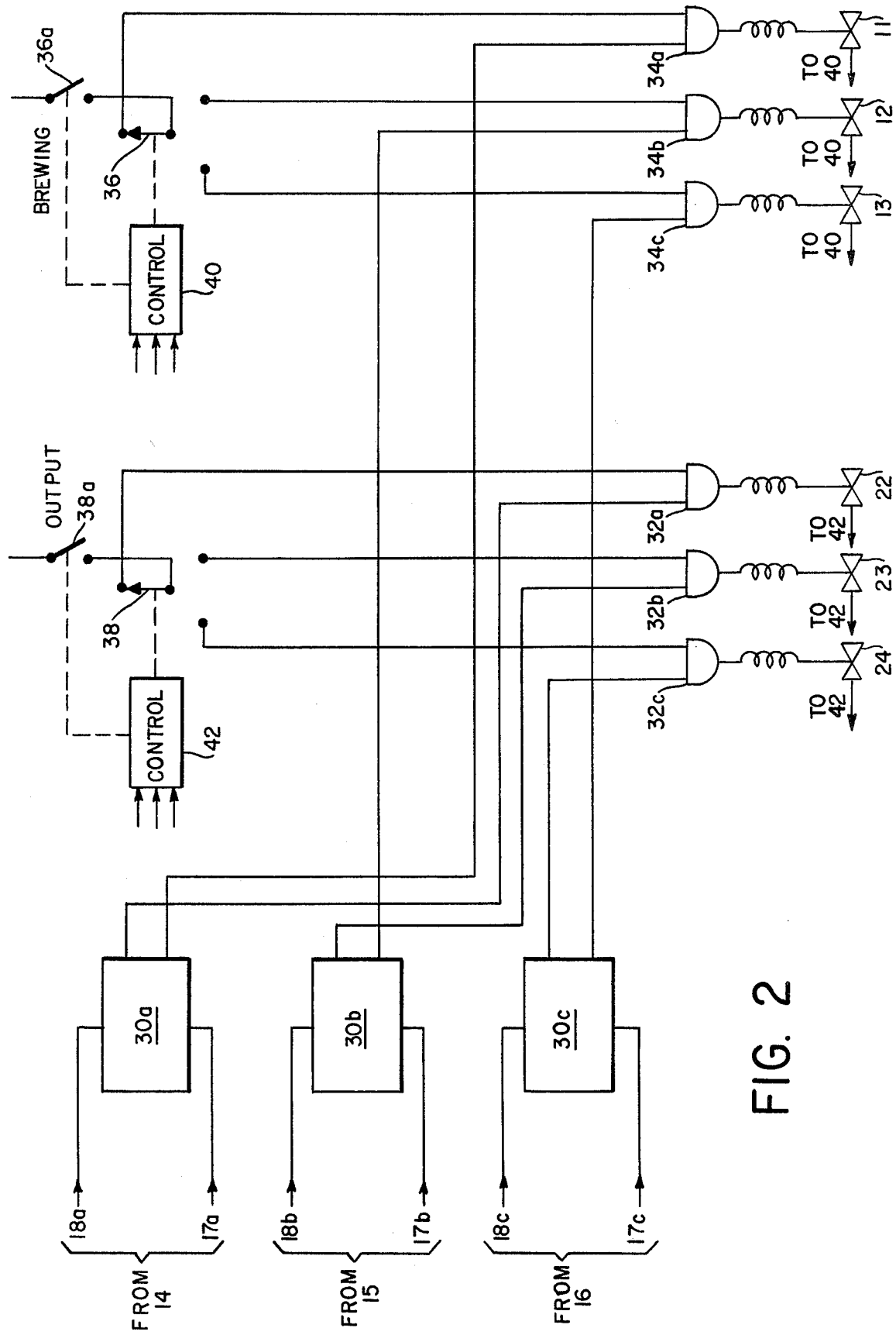

A preferred embodiment of the invention will now be described in detail with reference to the accompanying drawing, in which FIG. 1 is a schematic diagram of the preferred embodiment, and, FIG. 2 is a diagram of a typical electrical control system.

A brewing chamber 1 is connected both to a ground-coffee feeding device 2 and to pipes 3, 5, 6, and 9. The pipe 3 leads to a boiler 4, the pipe 5 leads via a magnetic valve 27 to a source of fresh water (not shown), and the pipe 6 leads to a distribution line 7. The pipe 3 is connected to the brewing chamber 1 via a three-way valve 8, and the pipe 9 leads to a receptacle (not shown) containing a cleansing agent. A drain 10 for flushed-out coffee grounds is also closed by means of a magnetic valve.

The distribution line 7 is connected via respective magnetic valves 11-13 to three storage containers 14-16, the capacity of each of which corresponds to one predetermined charge of brewed coffee. The storage containers 14-16 are respectively equipped with lower level sensors 17a, and 17c and with upper level sensors 18a, 18b, and 18c, the upper sensors responding when the brewed coffee reaches their level, and the lower sensors closing an electric circuit whenever the brewed coffee drops below their level. The containers 14-16 further respectively comprise drain pipes 19-21, connected via respective magnetic outlet valves 22-24 to a collector pipe 25 connected in turn to an outlet 26. Owing to this arrangement, the three storage containers 14-16 are connected in parallel between the brewing chamber 1 and the outlet 26 inasmuch as when the magnetic valves are operated accordingly, each of these containers 14-16 can, independently of the others, be filled from the brewing chamber 1 and emptied through the outlet 26.

The illustrated machine is further provided with controls (see FIG. 2) employing conventional means for causing the following mode of operation to be carried out automatically.

The assumed starting position is one in which the three containers 14-16 are empty and the valves 8, 12, 13, and 22-24 are closed. At the beginning of the brewing operation, a predetermined amount of ground coffee is conveyed through the feeding device 2 into the brewing chamber 1 by suitable control means (not shown) forming part of the general circuitry. When this operation is ended and the moving parts of the feeding device 2 have regained their initial position, the valve 8 is operated to cause hot water for brewing to flow from the boiler 4 into the brewing chamber 1. Brewed coffee is then produced by means of an automatic control, known per se, of the valve 8 and the ground-coffee feeding device 2.

After each charge, a mixture of hot and cold water from the pipes 3 and 5, respectively, is conveyed through the brewing chamber 1 for rinsing purposes by means of corresponding automatic operation of the valve 8 and 27 and of the control valve of the drain 10. After a certain number of rinsing operations, the cleansing agent is also added through the pipe 9 by appropriate operation of the valve 8. After a pre-adjustable period of time, the rinsing liquid leaves the brewing chamber 1 through the drain 10.

The brewed coffee reaches the distribution line 7 through the pipe 6, and then flows through the open valve 11 into the container 14, which is filled up by a single charge of brewed coffee, so that its upper level sensor 18a responds. As a result of this response, the valve 11 is closed and the valve 12 is opened, so that the next charge of brewed coffee is then conveyed to the container 15 and fills it. The container 15 being full, the upper level sensor 18b responds, thus causing the valve 12 to close again and the valve 13 to open until a single charge of brewed coffee has also filled the container 16 up to the level of the upper sensor 18c. The response of this last sensor causes the closing of the valve 13 and, since all three upper level sensors 18a, 18b, and 18c are responsive, also the closing of the pipe 3 by the valve 8, the interruption of the feed of ground coffee, and thus the cessation of the brewing operation.

The above-mentioned controls (not shown) include a push button which is operated to withdraw brewed coffee from the machine. The controls are so arranged that operation of the push button causes the opening of the outlet valve (22, 23, or 24) of that particular container (14, 15, or 16) whose lower level sensor (17a, 17b, or 17c) has not responded, i.e., is not above the level of the brewed coffee in the associated container. If this is true of all containers, the outlet valves are opened in the order 22-23-24. Assuming that all the containers are full, operation of the push button causes the valve 22 to open, so that the brewed coffee flows out of the container 14, through the left-hand section of the collector pipe 25, as viewed in the drawing, and out the outlet 26. As soon as the brewed coffee in the container 14 has reached the level of the sensor 17a, the valve 22 closes automatically and the valve 23 is opened so that the brewed coffee is then withdrawn from the container 15. Simultaneously, the level sensor 17a causes operation of the three-way valve 8 and of the ground-coffee feeding device 2 and causes the valve 11 to open, so that the container 14 can receive a new charge of freshly-brewed coffee. The sensor 18a thereupon closes the valve 11 in the manner already described and also opens the vale 12 providing that the container 15 is empty, i.e., that the sensor 17b is no longer in contact with the brewed coffee. If this is not the case, the sensor 18a interrupts the further brewing of coffee by appropriate control of the valve 8 and the feeding device 2. If coffee has been withdrawn from the container 15 to the extent that the level sensor 17b responds, the valve 23 and the valve 12 are automatically closed and freed to open, respectively, the actual opening of the valve 12 not occurring until the upper level sensor 18a of the container 14 has responded. This circuitwise connection as described between the containers 14 and 15, i.e., between their associated sensors and valves, is repeated between the containers 15 and 16 in that when the container 15 is empty, the valve 24 of the container 16 is opened, as is the valve 12 of the container 15, while the valve 23 closes. Brewed coffee is now withdrawn through the open valve 24, and as soon as the container 16 is empty, the prerequisites for withdrawal from the container 14 are created by the sensor 17c on condition that the sensor 18a has indicated by its response that the container 14 is completely full.

FIG. 2 is a schematic diagram of a conventional circuit for controlling the sequential filling and emptying of the containers 14, 15, 16. Other conventional circuits and devices also can be used. The lower level sensor 17a, 17b, 17c from each container 14, 15, 16 is connected to one input of a respective flip-flop 30a, 30b, 30c while the upper level sensor 18a, 18b, 18c is connected to the other input of the corresponding flip-flop. The upper output line of each flip-flop 30a, 30b, 30c is connected to one input of a corresponding AND gate 32a, 32b, 32c while the lower output line is connected to one input of a corresponding AND gate 34a, 34b, 34c. The other input to each AND 34a, 34b, 34c is from a contact of a stepping switch 36 in series with a brewing switch 36a while the other input to each AND 32a, 32b, 32C is from a contact of a stepping switch 38 in series with an outlet switch 38a. Controls 40 and 42 are provided for the respective switches 36, 36a and 38, 38a. AND gates 34a, 34b, 34c control the respective inlet (brewing) valves 11, 12 and 13 while AND gates 32a, 32b, 32c control the respective outlet valves 22, 23, 24.

The system is turned on and the brewing switch 36a is closed. Since all containers are empty all lower sensors 17a, 17b, 17c produce signals to trigger their corresponding flip-flops 30a, 30b, 30c such that the lower lines are high (1 state) and the upper lines are low (0 state). This places a 1 on the left-hand inputs of all of the AND gates 34a, 34b and 34c. The main outlet switch 38a is left open so that none of gates 32 can be conditioned. This keeps all outlet valves 22, 23 24 closed. A 1 signal is applied from switch 36a via stepping switch 36 to the input of the AND 34 to which switch 36 is connected, here 36c. This causes AND 34a to conduct opening valve 11 so that container 14 can be filled, when fresh coffee is brewed. When container 14 is filled, upper level sensor 18a produces a signal which switches the state of flip-flop 30a causing a 0 to be produced on its lower line. This closes inlet valve 11. The closing of valve 11 produces a signal which is applied to the stepping control 40 for switch 36 causing it to step one position placing a 1 signal on AND 34b cuasing it to conduct so that valve 12 is opened permitting container 15 to be filled. When 15 is filled, sensor 18b produces a signal which flips the state of flip-flop 30b, thereby closing valve 12 and producing a signal which will step switch 36 permitting valve 13 to be opened and container 16 to be filled. Closing of valve 13 produces a signal to control 40 which opens switch 36a and steps switch 36. All inlet valves 11, 12 and 13 are now closed.

To withdraw brewed coffee, switch 38a is closed and a 1 is applied through stepping switch 38 to AND 32a. This AND is conditioned to open valve 22 since a 1 appears on the upper line of flip-flop 30a due to the sensing of a full container 14 by sensor 18a. Coffee is now withdrawn from container 14 by a conventional spigot until the container is empty. Lower level sensor 17a senses this, switches the state of flip-flop 30a to close AND 32a and thereby close valve 22. The closing of valve 22 produces a signal applied to stepping control 42 so that AND 32b can now be conditioned and valve 23 open. This action continues until container 16 is emptied at which time valve 24 is opened producing a signal which causes control 42 open switch 38a.

The filling and outlet cycles are repeated as described above.

Because the same control relationships also exist between the containers 16 and 14, the three containers 14 to 16, connected in parallel between the brewing chamber 1 and the outlet 26, are successively filled and successively emptied in order, and when all three containers are filled, the controls are designed to interrupt the flow of brewed coffee.

Since the capacity of each of the storage containers, of which, incidentally, there may be only two or as many more as desired, corresponds to one charge of brewed coffee, the dispensing of fresh coffee is always assured whether the machine is called upon to dispense coffee frequently or less often. Furthermore, there is neither any mixing of fresh coffee with stale coffee nor any transfer from one container to another which might impair the aromatic properties of the beverage.

What is claimed is:

1. In a coffee-brewing machine of the type comprising at least one brewing chamber and an outlet for brewed coffee, the improvement comprising:
   a plurality of storage containers connected in parallel between said brewing chamber and said outlet, each said container having a capacity equal to one predetermined charge of brewed coffee, respective means in each said storage container for sensing when a said storage container is full with a charge of brewed coffee and empty of said charge and
   means responsive to the sensing by said sensing means of an empty condition of a said container, for successively filling each of said storage containers with a said predetermined charge of brewed coffee from said brewing chamber and responsive to the sensing by said sensing means of a full condition of said storage containers for successively fully emptying said containers so that a said container is able to receive a said predetermined charge of brewed coffee.

* * * * *